UNITED STATES PATENT OFFICE.

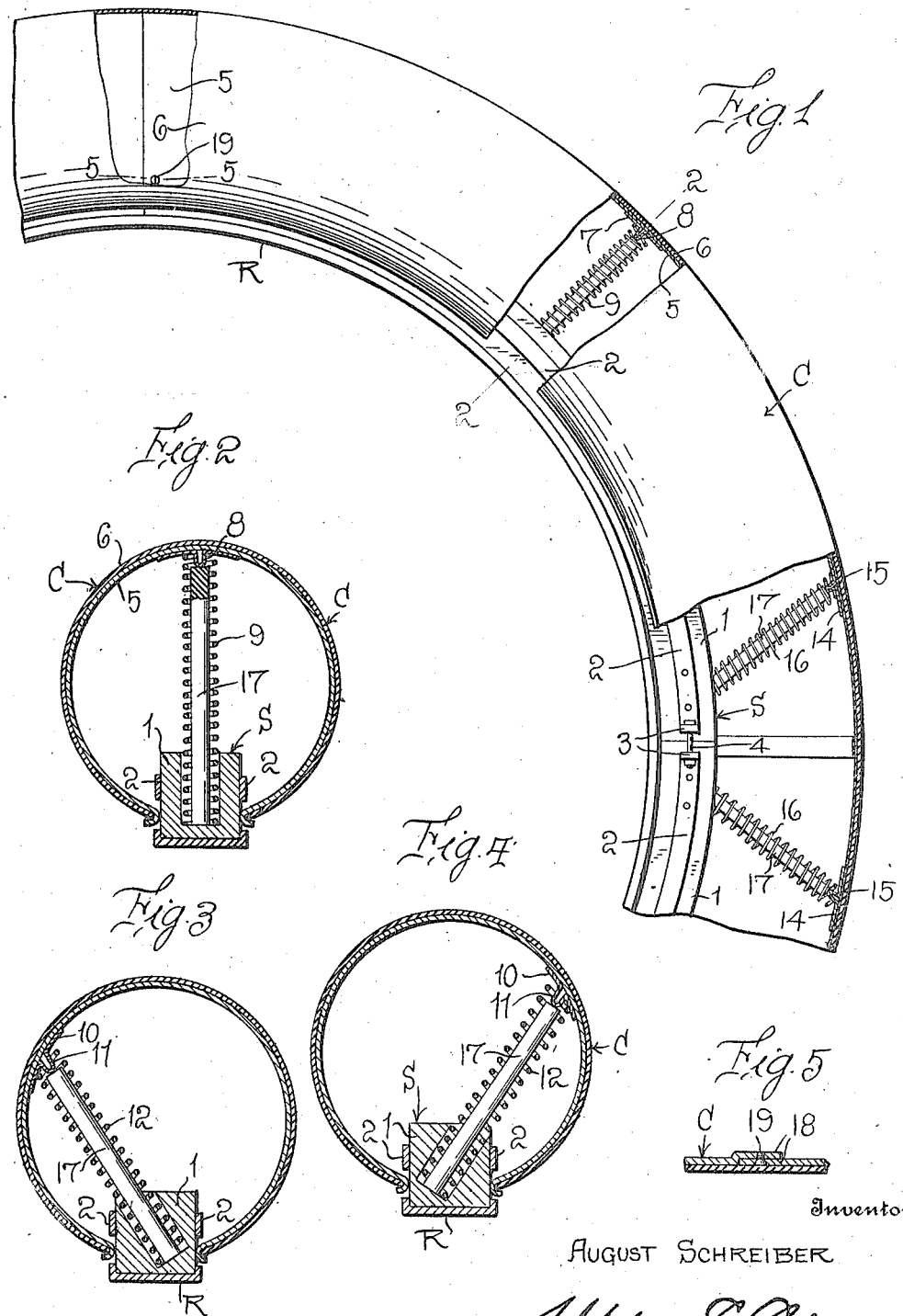

AUGUST SCHREIBER, OF BELOIT, KANSAS.

TIRE STRUCTURE.

1,249,517.  Specification of Letters Patent.  Patented Dec. 11, 1917.

Application filed April 21, 1917. Serial No. 163,711.

*To all whom it may concern:*

Be it known that I, AUGUST SCHREIBER, a citizen of the United States, residing at Beloit, in the county of Mitchell and State of Kansas, have invented certain new and useful Improvements in Tire Structures, of which the following is a specification, reference being had to the accompanying drawings.

This invention relates to certain improvements in tire structures and it is an object of the invention to provide a device of this general character having novel and improved means whereby the shocks and jars incident to travel are substantially entirely eliminated.

It is also an object of the invention to provide a novel and improved device of this general character which may be readily and effectively applied to a wheel.

The invention consists in the details of construction and in the combination and arrangement of the several parts of my improved tire structure whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein Fig. 1 is a fragmentary view in elevation with a portion broken away illustrating a tire structure constructed in accordance with an embodiment of my invention and in applied position;

Fig. 2 is a sectional view taken substantially on the line 2—2 of Fig. 1;

Fig. 3 is a sectional view taken through the tire structure and the adjacent wheel rim illustrating one of the lateral inclined expansible members;

Fig. 4 is also a sectional view taken through the tire structure and the coacting wheel rim showing a second form of lateral inclined expansible members as herein included; and Fig. 5 is a fragmentary sectional view taken substantially on the line 5—5 of Fig. 1.

As disclosed in the accompanying drawings, R denotes the rim or felly of a wheel of conventional construction and which is adapted to have disposed circumferentially thereof and clamped thereto the ring member S.

The ring member S as herein embodied is divided into a plurality of sections 1 preferably four in number and having secured to the opposite side faces thereof the metallic straps 2 terminating in the outwardly directed perforate extensions or ears 3. Disposed through adjacent extensions or ears 3 are the clamping bolts 4 whereby it will be perceived that the ring member S may be readily and effectively clamped to the rim or felly R or removed therefrom when the necessities of practice so necessitate. I have also found that the sections 1 of the ring member S may be made of wood.

C denotes the carcass of my improved tire which is preferably formed of thin resilient metal 5 and provided with an outer covering or lamination 6 of rubber.

The carcass C is of conventional form in cross section and has it marginal portions overlying the side faces of the member S. Secured to the inner face of the carcass C at the tread portion thereof and in predetermined circumferential spaced relation are the plates 7 having pressed outwardly therefrom the protuberances or lugs 8 with which coact the outer end portions of the radial expansible members 9 herein disclosed as conventional coil springs. The opposite end portions of the expansible members 9 are operatively engaged with the peripheral portion of the member S. The expansible members 9 serve to compensate for the direct or radial strain imposed upon the tire.

I also find it of advantage to provide the inner face of the carcass C at predetermined intervals and at opposite sides of its tread portion with the additional plates 10 also having pressed therefrom the protuberances or lugs 11 with which are operatively engaged the expansible members 12 also preferably embodying coil springs. The expansible members 12 are disposed on predetermined inclines laterally of the member S and have their inner ends operatively engaged therewith. The expansible members 12 serve to compensate for the lateral strain imposed upon the tire.

Additional plates 14 are arranged in pairs adjacent the coacting ends of the sections 1 of the member S and the plates 14 of each pair are in predetermined circumferentially spaced relation as particularly illustrated in Fig. 1. Each of the plates 14 has pressed outwardly therefrom the protuberance or lug 15. Coacting with the protuberance or lug 15 is the expansible member 16 disclosed as a conventional coil spring and which has its inner end portion operatively engaged with a section 1 and it is to be noted that the member 16 is inclined inwardly relative to the end of the coacting section 1 of the member S and serves to compensate for circumferential movement of the carcass C.

I have also found it of advantage to dispose within each of the expansible members or springs 9, 12 and 16 a core 17 of rubber which serves to materially facilitate the cushioning action imposed upon the carcass C. Each of the sections of the carcass has a radial spring 9 positioned substantially central thereof with circumferentially inclined springs 16 adjacent the opposite ends of the section. Intermediate each of the springs 16 and the central or radial spring 9 is a spring 12 and the spring 12 at one side of the spring 9 is oppositely inclined relative to the second spring 12.

It has also been found of advantage to form the metallic portion 5 of the carcass C in sections also preferably four in number. The adjacent end portions of the sections are arranged in overlying relation as clearly indicated at 18 in detail Fig. 5, and coacting with said overlying portions 18 is the securing member 19 herein set forth as a headed member loosely disposed through the outer overlying portion and in threaded engagement with the inner overlying portion.

From the foregoing description, it is thought to be obvious that a tire structure constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

In combination with a wheel, a ring member disposed circumferentially therearound, a substantially hollow carcass formed of resilient material and co-acting with the ring member, said carcass being divided circumferentially into sections, a radially disposed expansible member interposed between the ring member and the tread portion of each section of the carcass at substantially the longitudinal center of the carcass, expansible members interposed between the ring member and the opposite ends of each of the sections of the carcass, said expansible members being inclined circumferentially in a direction away from the ends of the sections, and laterally inclined expansible members interposed between the ring member and the carcass at opposite sides of the radially disposed expansible member of each section, the relation of the laterally inclined expansible members of each section to each other being in outward divergence.

In testimony whereof I hereunto affix my signature in the presence of two witnesses.

AUGUST SCHREIBER.

Witnesses:
L. A. WERGEN,
T. P. DOWNS.